(12) United States Patent
Wang et al.

(10) Patent No.: US 9,864,434 B2
(45) Date of Patent: Jan. 9, 2018

(54) GESTURE CONTROL OF INTERACTIVE EVENTS USING MULTIPLE WEARABLE DEVICES

(71) Applicant: Huami Inc., Mountain View, CA (US)

(72) Inventors: Fei Wang, Mountain View, CA (US);
Ting Chen, Mountain View, CA (US);
Mu Yu, Mountain View, CA (US)

(73) Assignee: Huami Inc., Mountain View, CA (US)

( * ) Notice: Subject to any disclaimer, the term of this patent is extended or adjusted under 35 U.S.C. 154(b) by 44 days.

(21) Appl. No.: 15/084,743

(22) Filed: Mar. 30, 2016

(65) Prior Publication Data
US 2017/0285756 A1    Oct. 5, 2017

(51) Int. Cl.
| | | |
|---|---|---|
| *G06F 3/01* | (2006.01) | |
| *H04B 1/3827* | (2015.01) | |
| *H04W 4/00* | (2009.01) | |
| *H04W 76/02* | (2009.01) | |

(52) U.S. Cl.
CPC ............. *G06F 3/017* (2013.01); *H04B 1/385* (2013.01); *H04W 4/005* (2013.01); *H04W 76/023* (2013.01)

(58) Field of Classification Search
None
See application file for complete search history.

(56) References Cited

U.S. PATENT DOCUMENTS

| | | |
|---|---|---|
| 7,114,079 B1 | 9/2006 | Cook et al. |
| 8,405,612 B2 | 3/2013 | Kruse et al. |
| 8,581,856 B2 | 11/2013 | Benko et al. |
| 8,743,052 B1 | 6/2014 | Keller et al. |
| 8,831,294 B2 | 9/2014 | Krupka et al. |
| 9,218,058 B2* | 12/2015 | Bress ....................... G06F 3/014 |
| 9,619,024 B2* | 4/2017 | Jiang ....................... G06F 3/015 |

(Continued)

FOREIGN PATENT DOCUMENTS

CN    104199546 A    12/2014

OTHER PUBLICATIONS

"Hand Gesture Recognition Wristband"; http://www.wearablesystems.org/hand-gesture-wristband/; Wearable Systems Lab, Training Human Movement; Mar. 23, 2016; 4 pages.

(Continued)

*Primary Examiner* — Joseph Haley
(74) *Attorney, Agent, or Firm* — Young Basile Hanlon & MacFarlane, P.C.

(57) ABSTRACT

Systems and methods for gesture control of an interactive event using multiple wearable devices are herein disclosed as comprising, in an implementation, receiving signal data indicative of at least one gesture from a first sensor of a first wearable device and a second sensor of a second wearable device, performing pre-processing on the signal data by a computing device in communication with the first wearable device and the second wearable device, performing feature extraction on the pre-processed signal data by the computing device, and determining the at least one gesture based on the feature extracted signal data and offline training data by the computing device. In an implementation, the first sensor and the second sensor comprise one or more of a three-axis accelerometer, a six-axis accelerometer, or an electromyography sensor, and can be configured to calibrate the other.

20 Claims, 7 Drawing Sheets

(56) References Cited

U.S. PATENT DOCUMENTS

| | | |
|---|---|---|
| 2007/0086626 A1 | 4/2007 | Mariani et al. |
| 2009/0167492 A1 | 7/2009 | Madafferi et al. |
| 2012/0154117 A1 | 6/2012 | Nice et al. |
| 2014/0028539 A1* | 1/2014 | Newham .............. G06F 1/1694 345/156 |
| 2014/0160030 A1* | 6/2014 | Wright ................. G06F 3/0489 345/173 |

OTHER PUBLICATIONS

Preece et al.; "A Comparison of Feature Extraction Methods for the Classification of Dynamic Activities From Accelerometer Data"; IEEE Transactions on Biomedical Engineering, vol. 56, No. 3, Mar. 2009; 9 pages.

Ram et al.; "A Novel Approach for Motion Artifact Reduction in PPG Signals Based on AS-LMS Adaptive Filter"; IEEE Transaction on Instrumentation and Measurement, vol. 61, No. 5, May 2012; 13 pages.

Joseph et al.; "ICA based System with WPT for Removal of Motion Artifacts in Photoplethysmogram (PPG) Signal"; International Journal of Engineering Research & Technology (IJERT), ISSN: 2278-0181, vol. 3, Issue 9; Sep. 2014; 4 pages.

\* cited by examiner

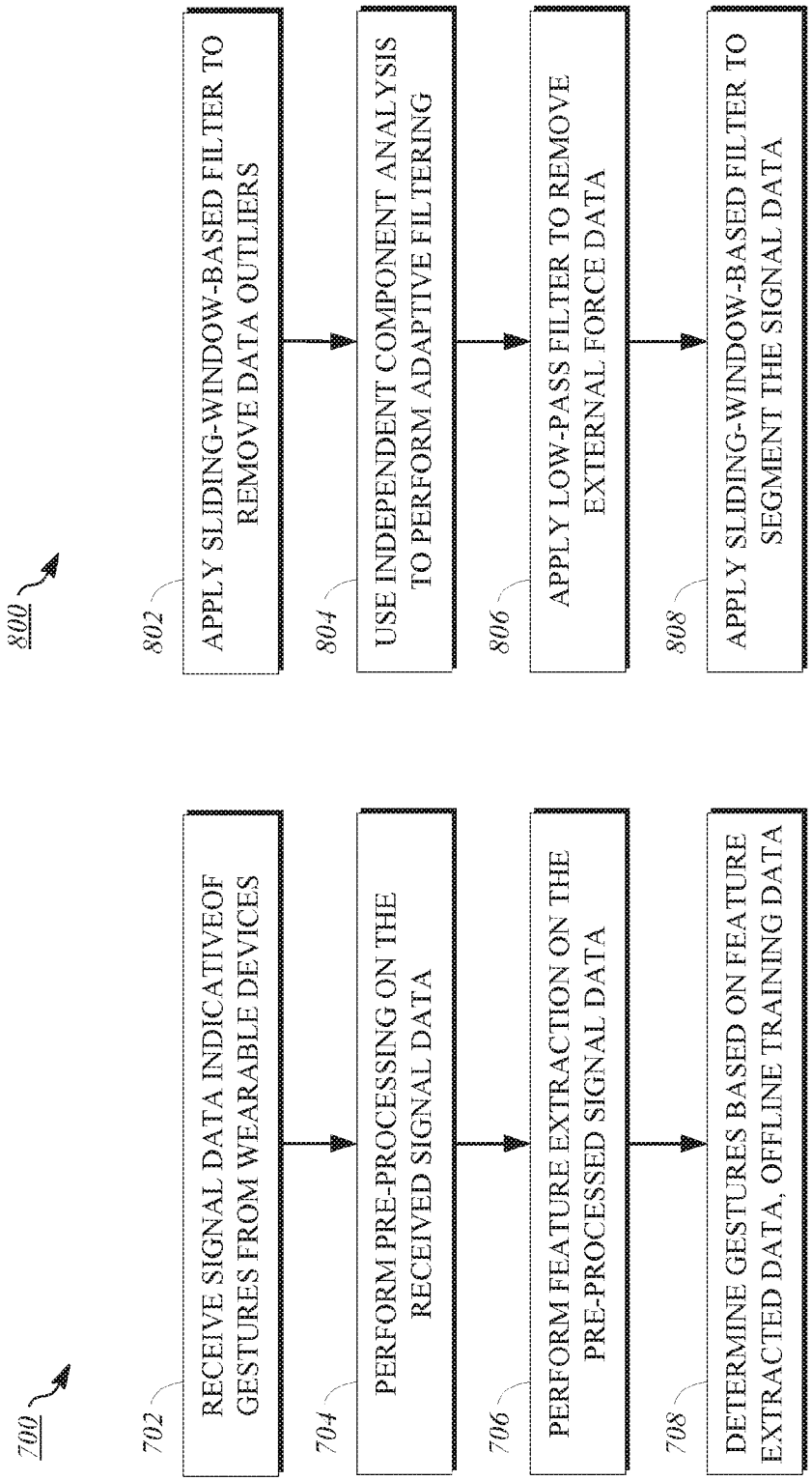

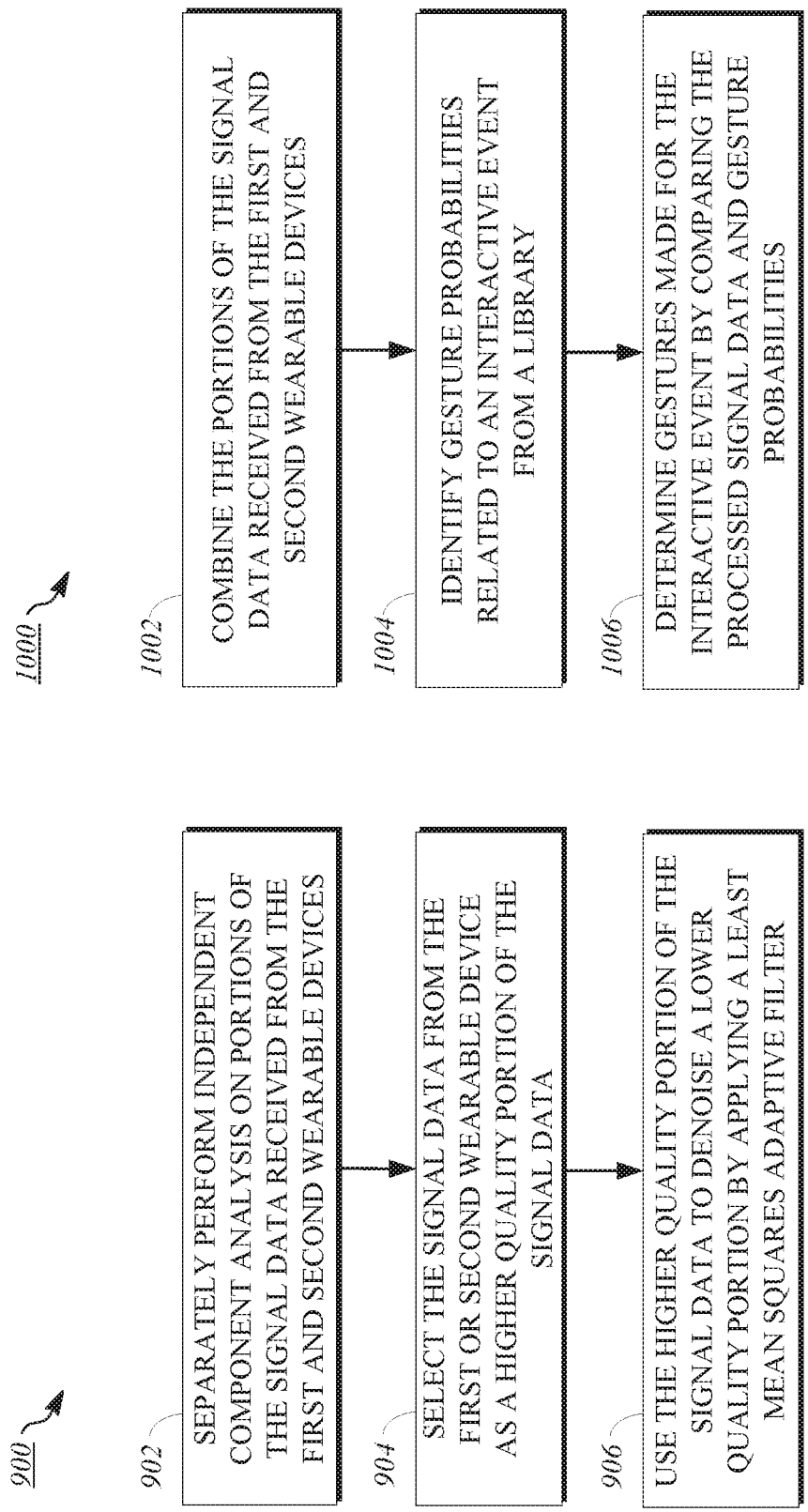

GESTURE CONTROL OF INTERACTIVE EVENTS USING MULTIPLE WEARABLE DEVICES

TECHNICAL FIELD

The present disclosure relates to gesture control of interactive events using multiple wearable devices.

BACKGROUND

Wearable devices are becoming increasingly commonplace. They may be used in a variety of contexts, such as to monitor the health of a user by measuring vital signals, track a user's exercise and fitness progress, check a user's emails or social media accounts, etc. In certain applications, wearable devices may be configured to interact with nearby objects. For example, a wearable device may be configured to operate a television or computer using Bluetooth or similar wireless communications technology. The wearable device may further be usable in connection with software, such as an application executed on a mobile device, for communicating data or interfacing with other devices.

SUMMARY

Disclosed herein are implementations of systems and methods for gesture control of interactive events using multiple wearable devices. An implementation of the disclosure is a method for gesture control of an interactive event using multiple wearable devices, comprising receiving, from a first sensor of a first wearable device and a second sensor of a second wearable device, signal data indicative of at least one gesture, performing, by a computing device in communication with the first wearable device and the second wearable device, pre-processing on the signal data, performing, by the computing device, feature extraction on the pre-processed signal data, and determining, by the computing device, the at least one gesture based on the feature extracted signal data and offline training data.

Another implementation of the disclosure is a wearable device for gesture control of an interactive event, comprising a body configured to be coupled to a portion of a user, a sensor comprising an accelerometer and an electromyography sensor, a communication component configured to communicate signal data generated by the sensor to at least one of a computing device or a second wearable device in communication with the computing device, and a memory and a processor configured to execute instructions stored in the memory to generate signal data indicative of a motion of the wearable device and a muscle activity of the portion of the user to which the body is coupled and communicate the signal data to the computing device for determining at least one gesture made by the user in connection with the interactive event.

Another implementation of the disclosure is a system for gesture control of an interactive event using multiple wearable devices, comprising a first wearable device comprising a first accelerometer, a first electromyography sensor, and a first communication component, second wearable device comprising a second accelerometer, a second electromyography sensor, and a second communication component, a computing device in communication with the first communication component and the second communication component, the computing device comprising a memory and a processor configured to execute instructions stored in the memory to receive signal data indicative of at least one gesture from the first wearable device and the second wearable device, perform pre-processing on the signal data, perform feature extraction on the pre-processed signal data, and determine the at least one gesture based on the feature extracted signal data and offline training data.

Details of these implementations, modifications of these implementations and additional implementations are described below.

BRIEF DESCRIPTION OF THE DRAWINGS

The description herein makes reference to the accompanying drawings, where like reference numerals refer to like parts throughout the several views, and where:

FIG. 7 is a flowchart showing an implementation of a method for using an implementation of the disclosure for gesture control of interactive events using multiple wearable devices;

FIG. 8 is a flowchart showing an implementation of a method for performing pre-processing on signal data received from multiple wearable devices usable within implementations of the disclosure;

FIG. 9 is a flowchart showing an implementation of a method for performing adaptive filtering using independent component analysis usable within implementations of the disclosure; and FIG. 10 is a flowchart showing an implementation of a method for determining gestures based on feature extracted signal data and offline training data usable within implementations of the disclosure.

DETAILED DESCRIPTION

Figure 1:
FIG. 1 is an illustration showing an implementation of a user using multiple wearable devices for gesture control of an interactive event.

Gesture recognition is used in various fields, including automotive, transit, consumer electronics, gaming, healthcare, and others. Gesture recognition refers generally to the identification of various gestures communicated by a person. It can also refer to the ability of a person or device to respond to various gestures in some meaningful way based on how the gestures are communicated. For example, gesture recognition can be used to control interactive events using devices configured to communicate data indicative of the gestures to a device on which the event occurs or is performed.

Configuring a device to effectively communicate a user's gesture for controlling an interactive event is complicated by the complexity of gestures and limitations on hardware capability. For example, determining that a user pointed a finger in a direction can be difficult where the gesture control device is not configured to detect movements associated with the user's finger or where the applicable movements cannot be discerned because of an abundance of movement data that is identified.

Solutions in various fields have attempted to solve the issue using different sensors to detect appropriate user gestures. For example, a first solution uses an RGB camera and an infrared laser as a depth sensor to scan an environment for movement. This solution can be used to track a user's movement throughout the environment, but it is not able to discern the specific gestures because it cannot sense the user's muscular activity. Another solution thus uses an electromyography (EMG) sensor within an armband to detect muscular activity in a user's arm. This way, signals indicative of a position and orientation of muscles within the user's arm can be used to more accurately determine gestures. However, this solution still fails because it cannot properly detect the motion, rotation, position, or orientation of the user's arm itself.

Implementations of the present disclosure include using multiple wearable devices to identify gestures for controlling an interactive event. Signal data indicative of a user's gestures can be communicated from sensors in first and second wearable devices, such as EMG sensors and accelerometers operative on a variety of axes, to a computing device on or through which an interactive event (e.g., a video game) is displayed, executed, or otherwise performed. The wearable devices can be held, worn, or otherwise coupled to the user as needed to accurately identify or generate the signal data by the sensors, for example, based on the specific manner in which the interactive event is interactive with the user. The signal data, prior to communication from the wearable devices, upon receipt by the computing device, or at some other point, can be processed to accurately identify the gestures made by the user. For example, signal data communicated from EMG sensors and accelerometers can undergo pre-processing to remove extraneous signal features, feature extraction to isolate signal features usable for identifying the gestures, and gesture recognition (e.g., using offline training based on labeled data) to determine the gestures.

The systems and methods of the present disclosure address problems particular to gesture recognition systems, particularly, for example, those that use multiple devices to communicate signal data. These gesture recognition-specific issues are solved by the disclosed implementations. The nature of gesture recognition systems and interactive events controllable by them, which involve increasingly complex technology, necessitates the development of new ways to communicate and process signal data indicative of user gestures to accurately detect the user gestures and execute instructions for using the specific, detected gestures to control interactive events.

FIG. 1 is an illustration 100 showing an implementation of a user using multiple wearable devices for gesture control of an interactive event. In an implementation, and as shown in the figure, the wearable devices can be wristbands worn around a user's wrist. Signal data indicative of the user's gestures can be generated by sensors of the wearable devices. The signal data can thereafter be communicated to a computing device configured to identify gestures based on the signal data. The computing device, or another device in communication with it, can be used to process an interactive event. For example, and as shown in the figure, a person playing a racing video game can control a car using wristbands as the wearable devices. The manner in which signal data communicated by the wearable devices can be used to control the video game can depend upon the program instructions of the video game. For example, and without limitation, a wearable device on the user's right arm can be used to control a velocity and acceleration of the vehicle, whereas a wearable device on the user's left arm can be used to control a direction of movement of the vehicle.

Illustration 100 represents only a single implementation of using multiple wearable devices for gesture control of an interactive event. For example, other implementations may include, without limitation, signal data communicated from the wearable devices being used to control other types of video games, selection of television channels, authentication and security measures (e.g., by requiring that specific gestures be made to grant access to electronic content or devices), and so on. The interactive event can be any event, process, instruction, occurrence, performance, or other action that involves user interaction, namely, based on a gesture communicated in connection with the use of the wearable devices. The interactive event can occur in a local environment or over a network based on the nature of the interactive event and a computing device through which the interactive event can be controlled using the signal data communicated from the wearable devices.

Figure 2:
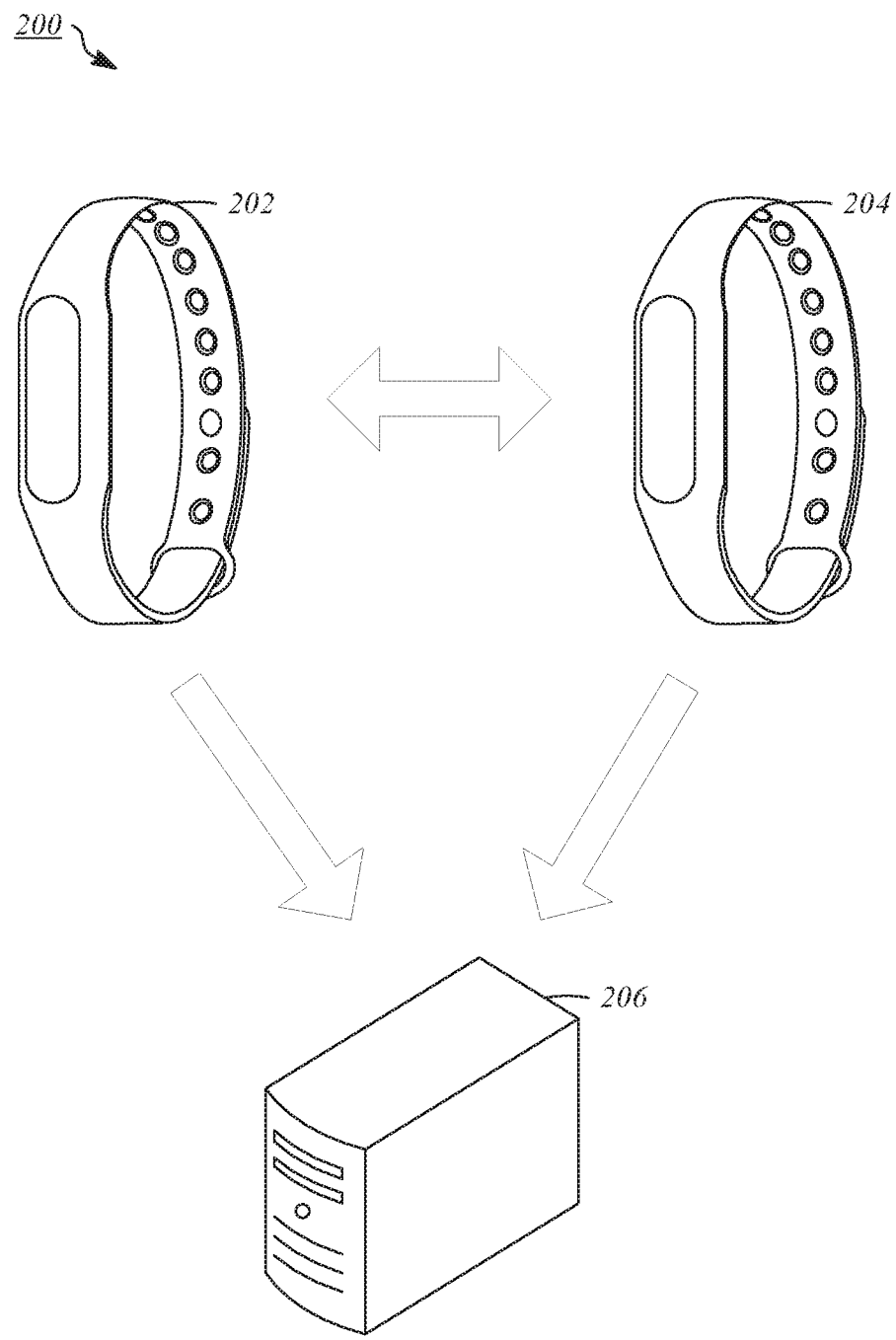
FIG. 2 is a diagram showing an implementation of data communication between multiple wearable devices and a computing device usable within implementations of the disclosure.

FIG. 2 is a diagram 200 showing an implementation of data communication between multiple wearable devices 202, 204 and a computing device 206 usable within implementations of the disclosure. Wearable devices 202, 204 can be implemented as any suitable wearable device, such as a brace, wristband, arm band, leg band, ring, headband, and the like. In an implementation, one or more of wearable devices 202, 204 comprise a body configured to be coupled to a portion of a user. For example, the body can be a band wearable about a user's wrist, ankle, arm, leg, or any other suitable part of the user's body. Various components for the operation of wearable devices 202, 204, such as those discussed below with respect to FIG. 3, may be disposed within or otherwise coupled to portions of the body. In an implementation wherein the body of one or more of wearable devices 202, 204 comprises a band, a securing mechanism 245 can be included to secure the band to the user. The securing mechanism 245 can comprise, for example, a slot and peg configuration, a snap-lock configuration, or any other suitable configuration for securing the band to the user.

Computing device 206 can be implemented as any suitable computing device or devices, such as one or more mobile telephones, tablet computers, laptop computers, notebook computers, desktop computers, video game consoles, televisions, server computers, mainframe computers, computer workstations, and the like. In an implementation, computing device 206 comprises instructions executable by a processor for generating, producing, or otherwise communicating an interactive event controllable at least in part using wearable devices 202, 204. For example, in an implementation wherein computing device 206 is a video game console, computing device 206 can cause data indicative of a video game controllable using wearable device 202, 204 to be output to display on a coupled television. In an implementation, computing device 206 comprises instructions for communicating data received from wearable devices 202, 204 to another device. For example, in an implementation wherein computing device 206 is a network device, such as a router, computing device 206 can receive data from wearable devices 202, 204 and communicate the data to another computer configured to process the data. In an implementation, computing device 206 can both process data indicative of an interactive event (e.g., by executing instructions for video game software, either directly or indirectly through another device) and/or signal data indicative of gestures for controlling the interactive event (e.g., from wearable devices 202, 204).

In an implementation, wearable devices 202, 204 and computing device 206 can communicate with one another. Any type of system can be used to facilitate this communication, including, without limitation, wired or wireless versions (as applicable) of Internet, intranet, Ethernet, WiFi, Bluetooth, radio frequency, near field communication (NFC), code division multiple access (CDMA), global system for mobile communications (GSM), long-term evolution (LTE), or the like. The communication can be over a wired or wireless network using routers, switches relays, servers, or the like for connecting the devices. In an implementation, the network used for facilitating communication between the devices can be a cloud computing environment. In an implementation, the network can be a local area network, Internet of Things (IoT) network, machine-to-machine network, or the like.

In an implementation, wearable devices 202, 204 can be used to calibrate one another, for example, based on direct communication between wearable devices 202, 204 or indirect communication, such as through computing device 206. Calibration can be used to reconfigure aspects of the sensors of wearable devices 202, 204, for example, to adjust how or when data is measured or otherwise generated by the sensors. In an implementation, calibration can be performed to adjust a sensitivity and/or accuracy of one or both of wearable devices 202, 204. In an implementation, for example, where the user can couple wearable devices to different portions of his or her body (e.g., by holding or wearing them by or around a hand, foot, arm, leg, etc.), calibration can be performed to recognize the portion of the user's body to which one or both of wearable devices 202, 204 is or are coupled, for example, based on a position of one with respect to the other.

Figure 3:
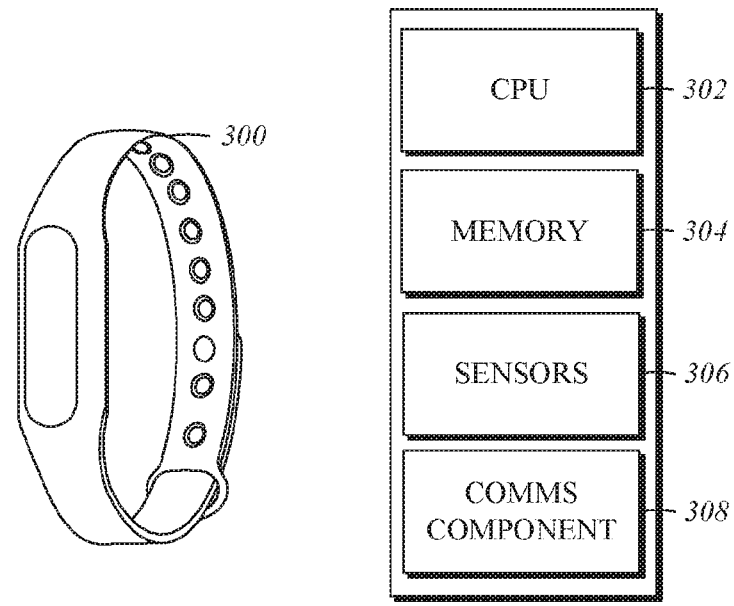
FIG. 3 is a diagram of an implementation of a wearable device usable within implementations of the disclosure.

FIG. 3 is a diagram of an implementation of a wearable device 300 usable within implementations of the disclosure. Wearable device 300 can be implemented by one or more wearable devices, such as the implementations of the wearable devices discussed above with respect to FIG. 2. In an implementation, wearable device 300 comprises CPU 302, memory 304, sensors 306, and communications component 308. One example of CPU 302 is a conventional central processing unit. CPU 302 may include single or multiple processors each having single or multiple processing cores. Alternatively, CPU 302 may include another type of device, or multiple devices, capable of manipulating or processing information now-existing or hereafter developed. Although implementations of wearable device 300 can be practiced with a single CPU as shown, advantages in speed and efficiency may be achieved using more than one CPU.

Memory 304 can comprise random access memory device (RAM) or any other suitable type of storage device. Memory 304 may include executable instructions and data for immediate access by CPU 302, such as data generated and/or processed in connection with sensors 306. Memory 304 may include one or more DRAM modules such as DDR SDRAM. Alternatively, memory 304 may include another type of device, or multiple devices, capable of storing data for processing by CPU 302 now-existing or hereafter developed. CPU 302 may access and manipulate data in memory 304 via a bus.

Sensors 306 can be one or more sensors disposed within or otherwise coupled to wearable device 300, for example, for identifying, detecting, determining, or otherwise generating signal data indicative of measurements associated with wearable device 300 and/or a user wearing wearable device 300. In an implementation, sensors 306 can comprise one or more EMG sensors, accelerometers, cameras, lights, touch sensors, and the like. The accelerometers can be three-axis, six-axis, nine-axis or any other suitable accelerometers. The cameras can be RGB cameras, infrared cameras, monochromatic infrared cameras, or any other suitable cameras. The lights can be infrared light emitting diodes (LED), infrared lasers, or any other suitable lights. Implementations of sensors 306 can include a single sensor, one of each of the foregoing sensors, or any combination of the foregoing sensors. In an implementation, a first wearable device comprises a first sensor and a second wearable device comprises a second sensor, wherein the first sensor and the second sensor can be the same sensor or combination of sensors or different sensors altogether. In an implementation, the signal data can be identified, detected, determined, or otherwise generated based on any single sensor or combination of sensors across one or more wearable devices.

In an implementation, a sensor of a first wearable device can be used to calibrate a sensor of a second wearable device. For example, sensors 306 of a first wearable device can be used to calibrate like sensors of a second wearable device (e.g., by using a first EMG sensor to calibrate a second EMG sensor). As another example, sensors 306 of a first wearable device can be used to calibrate different sensors of a second wearable device (e.g., by using an EMG sensor to calibrate an accelerometer). Implementations for using a first sensor to calibrate a second sensor are discussed below with respect to FIGS. 5A and 5B.

Communications component 308 is a hardware component configured to communicate data (e.g., measurements, etc.) from sensors 306 to one or more external devices, such as another wearable device or a computing device, for example, as discussed above with respect to FIG. 2. In an implementation, communications component 308 comprises an active communication interface, for example, a modem, transceiver, transmitter-receiver, or the like. In an implementation, communications component 308 comprises a passive communication interface, for example, a quick response (QR) code, Bluetooth identifier, radio-frequency identification (RFID) tag, a near-field communication (NFC) tag, or the like. Implementations of communications component 308 can include a single component, one of each of the foregoing types of components, or any combination of the foregoing components.

Wearable device 300 can also include other components not shown in FIG. 3. For example, wearable device 300 can include one or more input/output devices, such as a display. In an implementation, the display can be coupled to CPU 302 via a bus. In an implementation, other output devices may be included in addition to or as an alternative to the display. When the output device is or includes a display, the display may be implemented in various ways, including by an LCD, CRT, LED, OLED, etc. In an implementation, the display can be a touch screen display configured to receive touch-based input, for example, in manipulating data output to the display.

Figure 4:
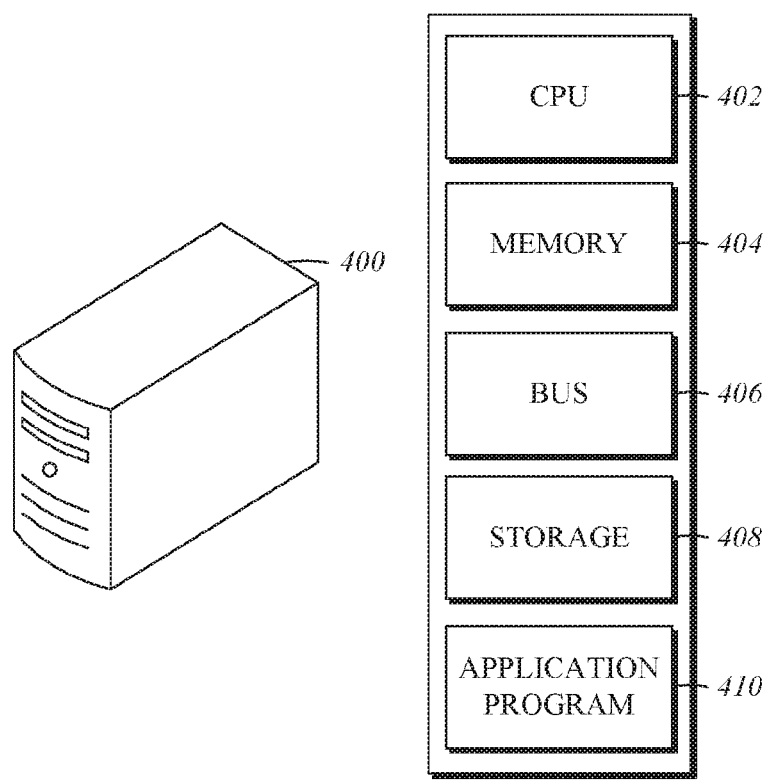
FIG. 4 is a diagram of an implementation of a computing device usable within implementations of the disclosure.

FIG. 4 is a diagram of an implementation of a computing device 400 usable within implementations of the disclosure. Computing device 400 can be implemented by one or more wearable devices, such as the implementations of the wearable devices discussed above with respect to FIG. 2. As with the CPU of FIG. 3, one example of CPU 402 is a conventional central processing unit. CPU 402 may include single or multiple processors each having single or multiple processing cores. Alternatively, CPU 402 may include another type of device, or multiple devices, capable of manipulating or processing information now-existing or hereafter developed. Although implementations of computing device 400 can be practiced with a single CPU as shown, advantages in speed and efficiency may be achieved using more than one CPU.

As with the memory of FIG. 3, memory 404 can comprise RAM or any other suitable type of storage device. Memory 404 may include executable instructions and data for immediate access by CPU 402. Memory 404 may include one or more DRAM modules such as DDR SDRAM. Alternatively, memory 404 may include another type of device, or multiple devices, capable of storing data for processing by CPU 402 now-existing or hereafter developed. CPU 402 may access and manipulate data in memory 404 via bus 406.

Storage 408 can include executable instructions along with other data. Examples of executable instructions may include, for example, an operating system and one or more application programs for loading in whole or part into memory 404 and to be executed by CPU 402. The operating system may be, for example, Windows, Mac OS X, Linux, or another operating system suitable for the details of this disclosure. Storage 408 may comprise one or multiple devices and may utilize one or more types of storage, such as solid state or magnetic.

Application program 410 can be executable instructions for processing signal data communicated from one or more wearable devices, processing an interactive event, or both. For example, in an implementation where computing device 400 directly controls the interactive event (e.g., by executing instructions for the interactive event using CPU 402 without another device being used to perform the interactive event), application program 410 can comprise executable instructions for receiving the signal data, processing the signal data, and effecting a change to the interactive event based on the signal data, for example, by executing instructions indicative of the signal data responsive to the interactive event. In another example, in an implementation where computing device 400 does not directly control the interactive event and instead communicates the signal data to one or more other devices performing the interactive event, application program 410 can comprise executable instructions for receiving the signal data and communicating the signal data to the one or more other devices.

Computing device 400 can also include other components not shown in FIG. 4. For example, computing device 400 can include one or more input/output devices, such as a communications component and a display. In an implementation, the communications component and/or display can be coupled to CPU 402 via bus 406. In an implementation, communications component 308 comprises an active communication interface, for example, a modem, transceiver, transmitter-receiver, or the like. In an implementation, the communications component can be a passive communication interface, for example, a quick response (QR) code, Bluetooth identifier, radio-frequency identification (RFID) tag, a near-field communication (NFC) tag, or the like. Implementations of the communications component can include a single component, one of each of the foregoing types of components, or any combination of the foregoing components. In an implementation, other output devices may be included in addition to or as an alternative to the display. When the output device is or includes a display, the display may be implemented in various ways, including by an LCD, CRT, LED, OLED, etc. In an implementation, the display can be a touch screen display configured to receive touch-based input, for example, in manipulating data output to the display.

Figure 5:
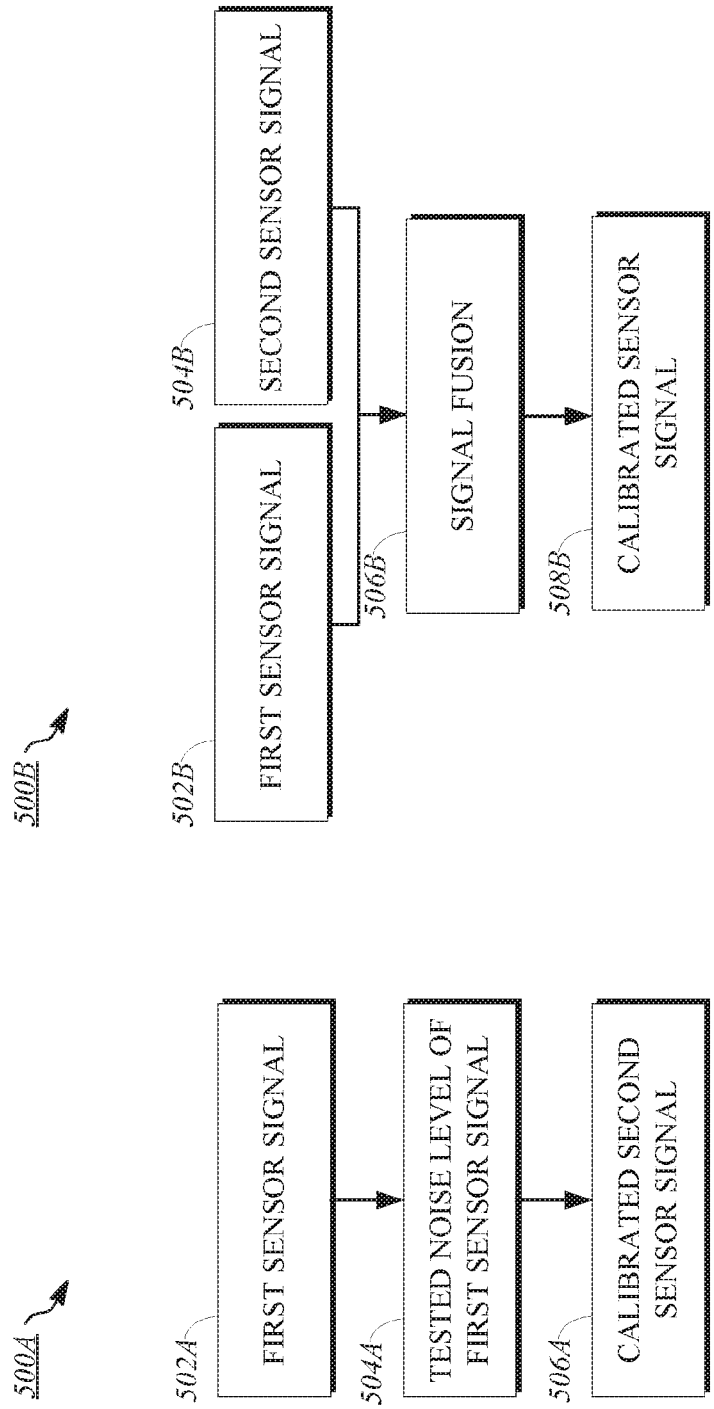
FIGS. 5A and 5B are logic diagrams showing implementations of using a first sensor to calibrate a second sensor in accordance with implementations of the disclosure.

FIGS. 5A and 5B are logic diagrams 500A and 500B, respectively, showing implementations of using a first sensor to calibrate a second sensor in accordance with implementations of the disclosure. Referring to FIG. 5A, a first sensor signal 502A can be generated, for example, by or in association with a first sensor of a first wearable device. In an implementation, the first sensor signal 502A can be processed, for example, to determine tested noise level of first sensor signal 504A. In an implementation, tested noise level of first sensor signal 504A can be representative of a baseline value for a signal generated by the first sensor. That is, a second sensor signal, which may be generated by or in association with a second sensor of a second wearable device, can be calibrated to the first sensor signal 502A based on tested noise level of first sensor signal 504A. For example, in an implementation wherein the first and second sensor are the same type of sensor, such as an EMG sensor, tested noise level of first sensor signal 504A can be used to remove baseline wander data from the second sensor signal to calibrate the second sensor signal to the first sensor signal 502A.

Referring to FIG. 5B, first sensor signal 502B and second sensor signal 504B can be combined to generate or otherwise form a calibrated sensor signal. First sensor signal 502B and second sensor signal 504B can be input to a signal fusion 506B operation for combining same. In an implementation, signal fusion 506B can comprise using noise variance to combine first sensor signal 502B and second sensor signal 504B. For example, first sensor signal 502B can be compared to second sensor signal 504B to determine noise variance, which can be extracted, reduced, or otherwise manipulated to combine the data of the respective signals. In an implementation, signal fusion 506B can use a Kalman filter to combine first sensor signal 502B and second sensor 504B. Calibrated sensor signal 508B can be generated in response to signal fusion 506B, which calibrated sensor signal 508B can thus be a single sensor signal calibrated based on two (or more) input signals.

Figure 6:
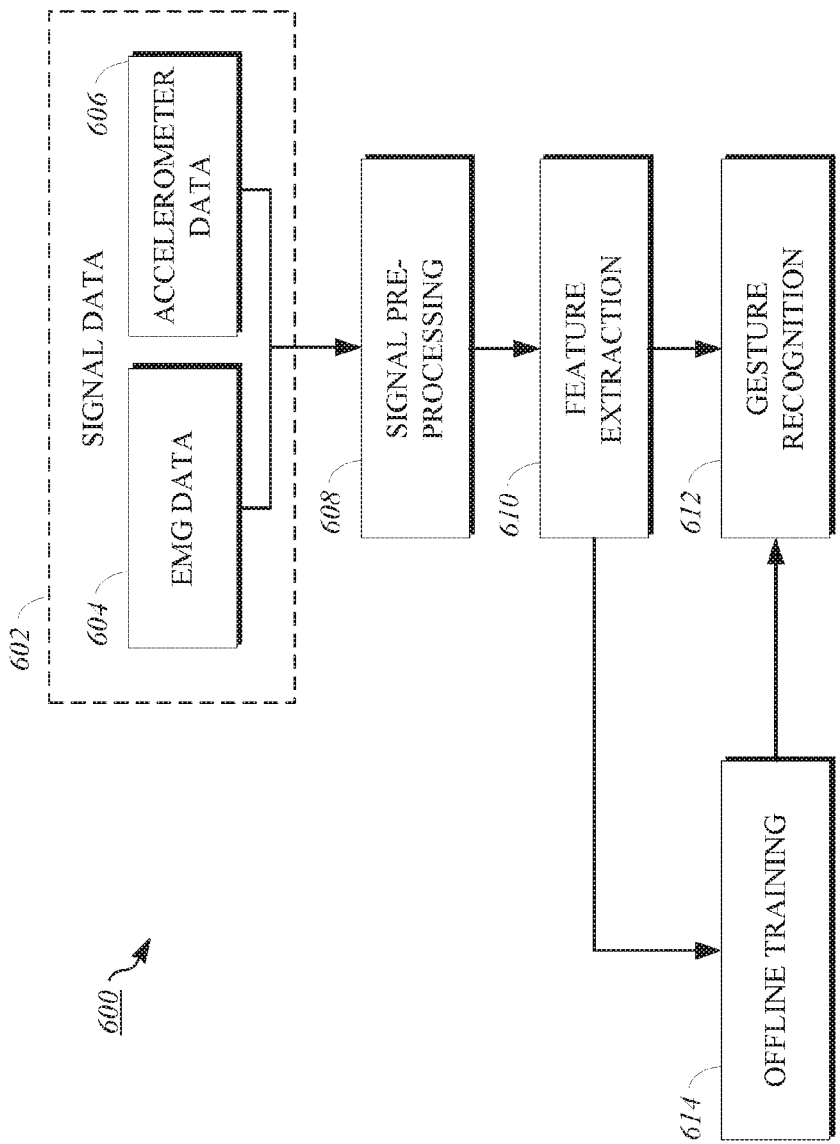
FIG. 6 is a logic diagram showing an implementation of how data from multiple wearable devices are processed in accordance with implementations of the disclosure.

FIG. 6 is a logic diagram 600 showing an implementation of how data from multiple wearable devices are processed in accordance with implementations of the disclosure. Implementations of logic diagram 600 can be performed entirely on the wearable devices on which the sensor data is generated or on the wearable devices and a computing device in communication with the wearable devices. For example, the signal processing aspects of logic diagram 600 can be performed by instructions executable by the computing device. In an implementation, portions of logic diagram 600 can be performed by instructions executable on the computing device and one or more other devices.

In an implementation, signal data 602 is generated by sensors of the wearable devices. For example, signal data 602 can comprise EMG data 604 and accelerometer data 606 generated from one or more EMG sensors and accelerometers, respectively, within one or more wearable devices. In an implementation, signal data 602 can comprise other or additional data based on the particular implementations of the sensors coupled to or otherwise operated in connection with the wearable devices.

In an implementation, signal data 602 is processed by various operations, such as signal pre-processing 608, feature extraction 610, and gesture recognition 612. In an implementation, signal pre-processing 608 can be performed to remove extraneous signal features, such as those unnecessary for determining a gesture made using the wearable devices, from signal data 602. In an implementation, feature extraction 610 can be performed on pre-processed signal data to isolate signal features usable for identifying the gestures made using the wearable devices, for example, by extracting time-domain features and frequency-domain features. In an implementation, gesture recognition 612 can be performed to determine the actual gestures made using the wearable devices, for example, using the feature extracted signal data and offline training 614, which can process the feature extracted signal data based on labeled data. In an implementation, the output of gesture recognition 612 can include instructions for responding to an interactive event, for example, to control a character of a video game.

Further implementations of the disclosure will now be described with reference to FIGS. 7 through 10. The steps, or operations, of any method, process, or algorithm described in connection with the embodiments disclosed herein may be embodied directly in hardware, firmware, software executed by hardware, circuitry, or a combination of these. Broadly, methods 700, 800, 900, and 1000 of FIGS. 7, 8, 9, and 10, respectively, are used to perform certain processing and analysis as discussed above with respect to FIG. 6. In an implementation, methods 700, 800, 900, and 1000 may be executed using one or more machines and hardware such as the equipment of FIGS. 1 through 4. One or all of methods 700, 800, 900, and 1000 may be performed, for example, by executing a machine-readable program of Javascript, C, or other such instructions. In an implementation, one or all of methods 700, 800, 900, and 1000 can be performed by a computing device, such as computing device 206 of FIG. 2, and/or by one or more other devices in communication with the computing device and/or one or more wearable devices, such as wearable devices 202, 204 of FIG. 2.

For ease of explanation, methods 700, 800, 900, and 1000 are depicted and described as a series of operations. However, operations in accordance with this disclosure may occur in various orders and/or concurrently. Additionally, operations in accordance with this disclosure may occur with other operations not presented and described herein. Furthermore, not all illustrated operations may be required to implement a method in accordance with the disclosed subject matter.

FIG. 7 is a flowchart showing an implementation of a method 700 for using an implementation of the disclosure for gesture control of interactive events using multiple wearable devices. At operation 702, signal data indicative of gestures made by a user are received from wearable devices. In an implementation, the signal data comprises data, such as sensor data 602 of FIG. 6, communicated from one or more sensors included within, coupled to, or otherwise operative in connection with the wearable devices. In an implementation, the signal data can be communicated at separate times from the wearable devices or simultaneously (or near simultaneous, as permitted by the hardware configurations of the wearable devices and computing device). The signal data is indicative of one or more gestures made by a user of the wearable devices and can be processed to interact with an interactive event, for example, by controlling a character of a video game.

At operation 704, the received signal data undergoes pre-processing, for example, to remove extraneous features from the signal data. That is, signal pre-processing can be done to remove unnecessary data (e.g., aspects of the communicated signal data not related or material to determining a gesture indicated by the signal data). In an implementation, performing signal pre-processing includes using filters, for example, sliding-window-based average or median filters, adaptive filters, low-pass filters, and the like, to remove the unnecessary data. Implementations for performing signal pre-processing are discussed below with respect to FIG. 8.

At operation 706, feature extraction is performed on the pre-processed signal data, for example, to isolate signal features usable for identifying gestures made using the wearable devices. That is, feature extraction can be done to determine exactly which portions of the communicated, pre-processed signal data are directed to the actual gestures made by the user of the wearable devices. In an implementation, performing feature extraction includes extracting one or more time-domain and/or frequency-domain features from the pre-processed signal data.

The time-domain features extractable from the pre-processed signal data include, for example, temporal mean features, feature variations within specified or unspecified time windows, local minimum temporal features, local maximum temporal features, temporal variances and medians, mean-crossing rates, and the like. The time-domain features can be identified, for example, based on a correlation between sensors and/or wearable devices. The frequency-domain features extractable from the pre-processed signal data include, for example, wavelet features, Fast Fourier transform features (e.g., peak positions), discrete cosine transform features, arithmetic cosine transform features, Hilbert-Huang transform features, spectrum sub-band energy features or ratios, and the like. The frequency-domain features can also include spectrum entropy, wherein high entropy can be discerned based on inactivity (e.g., stationarity) indicative of a uniform data distribution and low entropy can be discerned based on activity (e.g., movement) indicative of a non-uniform data distribution.

At operation 708, gestures made using the wearable devices can be determined based on the feature extracted signal data and offline training data. That is, the signal data processed at operations 704 and 706 can be used along with offline training data that is based on labeled data to determine actual gestures made using the wearable devices. In an implementation, determining the gestures includes comparing the processed signal data with the offline training data to reference similarities between them. Implementations for determining gestures using feature extracted signal data and offline training data are discussed below with respect to FIG. 10.

FIG. 8 is a flowchart showing an implementation of a method 800 for performing pre-processing on signal data received from multiple wearable devices usable within implementations of the disclosure. In an implementation, method 800 represents sub-operations for performing operation 704 of method 700. At operation 802, a first filter is applied to the signal data to remove data outliers, which may, for example, represent portions of the communicated signal data not indicative of the actual gesture that was made. In an implementation, the first filter can be a sliding-window-based filter, such as a sliding-window-based average filter or a sliding-window-based median filter.

At operation 804, adaptive filtering is performed with respect to the signal data. In an implementation, adaptive filtering is performed using independent component analysis, for example, to distinguish between signal data features communicated from different sensors of the wearable devices. In an implementation, performing adaptive filtering on the signal data comprises determining a higher quality portion of the signal data and processing the signal data using the higher quality portion to denoise a lower quality portion. Implementations for performing adaptive filtering using independent component analysis are discussed below with respect to FIG. 9.

At operation 806, data indicative of external forces included within the communicated signal data can be removed, for example, using a low-pass filter. In an implementation, the external forces can be any force external to the gesture being made, for example, a gravitational force. Removal of external forces can be done to distinguish features of the communicated signal data indicative of user activity from those indicative of non-activity. For example, features indicative of non-activity can be removed from the signal data to better focus on data that may be indicative of the gestures made.

At operation 808, the signal data can be segmented to complete pre-processing. Segmentation can be done to better indicate or identify aspects of the signal data comprising data indicative of the gesture made by a user of the wearable devices, for example, by separating the signal data into or otherwise identifying it as comprising different groups of data indicative of different gesture features. In an implementation, segmentation can be performed by applying a sliding-window-based filter to the signal data. In an implementation wherein method 800 represents a sub-operation for performing operation 704 of method 700, method 800 can conclude by continuing to an operation of method 700 following operation 704, for example, operation 706.

FIG. 9 is a flowchart showing an implementation of a method 900 for performing adaptive filtering using independent component analysis usable within implementations of the disclosure. In an implementation, method 900 represents sub-operations for performing operation 804 of method 800. At operation 902, independent component analysis is separately performed on portions of the signal data received from the wearable devices. For example, the signal data can include data from a first accelerometer of a first wearable device and a second accelerometer of a second wearable device. Independent component analysis can be performed on the first and second accelerometer data to separately identify a synthetic noise signal representative of motion artifacts within the first and second accelerometer data.

At operation 904, signal data from one wearable device can be selected as a higher quality portion of the signal data. For example, the adaptive filter can then test the signal data from the first accelerometer and the second accelerometer for random features based on the synthetic noise signal, for example, based on a correlation between the signal data and the motion artifacts. The test can be applied to the data from each accelerometer individually such that a higher quality set of accelerometer data can be identified by comparing the tested first accelerometer data and the tested second accelerometer data. For example, the higher quality signal data can be determined based on a quantity of random features, wherein a lower quantity is indicative of a higher quality.

At operation 906, the selected higher quality portion of the signal data can be used to denoise a lower quality portion of the signal data. That is, the signal data can be processed using the higher quality signal data to guide the denoising of the lower quality signal data. For example, where the first accelerometer data is determined to be the higher quality signal data, the first accelerometer data is used to denoise the second accelerometer data. In an implementation, processing the signal data in this way can be done using a least means squares algorithm. In an implementation wherein method 900 represents a sub-operation for performing operation 804 of method 800, method 900 can conclude by continuing to an operation of method 800 following operation 804, for example, operation 806.

FIG. 10 is a flowchart showing an implementation of a method 1000 for determining gestures based on feature extracted signal data and offline training data usable within implementations of the disclosure. In an implementation, method 1000 represents sub-operations for performing operation 708 of method 700. At operation 1002, portions of the signal data received from the different wearable devices can be combined. For example, where two wearable devices are used for gesture control of an interactive event, the signal data from a first wearable device can be combined with the signal data of the second wearable device to generate processed signal data. In an implementation, generating the processed signal data can be done by adding the signal data of the first wearable device to the signal data of the second wearable device. In an implementation, generating the processed signal data can instead be done by adding the signal data of the second wearable device to the signal data of the first wearable device.

At operation 1004, gesture probabilities related to an interactive event can be identified. Operation 1004 can be performed before, after, or at the same time as operation 1002 is performed. In an implementation, the gesture probabilities can be identified by referencing a library comprising data associated with one or more interactive events. In an implementation, the gesture probabilities can indicate a probability that a corresponding gesture is signaled for the interactive event. For example, the probability can be based on the frequency that the gesture can be made based on the interactive event (e.g., the frequency that a character of a video game can be controlled to move in a particular direction or perform a particular action), the likelihood of the gesture being made based on a body part of the user to which the wearable device communicating the signal data is coupled (e.g., by considering how often the user's arm may be used to point towards or swing an object), and so on. In an implementation, the offline training data comprises data indicative of combinations of all possible activity combinations and their corresponding gesture probabilities (e.g., based on gestures per body part, past user data, etc.). In an implementation, other bio-mechanical models indicative of body part gesture probabilities can be included within or used as a supplementary reference by the offline training data.

At operation 1006, the gesture made by the user using the wearable devices can be determined by comparing the processed signal data of operation 1002 and the identified gesture probabilities of operation 1004. For example, where the processed signal data is determined to be similar or identical to gesture data represented within the offline training data, it can be determined that the processed signal data is indicative of a gesture corresponding to that gesture data. In an implementation, comparing the processed signal data and the identified gesture probabilities relative to the interactive event can be done by overlaying the respective data and quantizing the differences, wherein a lower number of differences can be indicative of a higher similarity between the data. In an implementation wherein method 1000 represents a sub-operation for performing operation 708 of method 700, method 1000 can conclude by continuing to an operation of method 700 following operation 708. In an implementation wherein operation 708 represents a final operation of method 700, the completion of method 1000 can also indicate the completion of method 700.

While the foregoing disclosure shows a number of illustrative implementations, it will be apparent to those skilled in the art that various changes and modifications can be made herein without departing from the scope of the disclosure as defined by the appended claims. Accordingly, the disclosed implementations are representative of the subject matter which is broadly contemplated by the present disclosure, and the scope of the present disclosure fully encompasses other embodiments which may become obvious to those skilled in the art, and that the scope of the present disclosure is accordingly to be limited by nothing other than the appended claims.

All structural and functional equivalents to the elements of the above-described implementations that are known or later come to be known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same implementation unless described as such.

Furthermore, although elements of the disclosure may be described or claimed in the singular, reference to an element in the singular is not intended to mean "one and only one" unless explicitly so stated, but shall mean "one or more." Additionally, ordinarily skilled artisans will recognize in view of the present disclosure that while operational sequences must be set forth in some specific order for the purpose of explanation and claiming, the present disclosure contemplates various changes beyond such specific order.

In addition, those of ordinary skill in the relevant art will understand that information and signals may be represented using a variety of different technologies and techniques. For example, any data, instructions, commands, information, signals, bits, symbols, and chips referenced herein may be represented by voltages, currents, electromagnetic waves, magnetic fields or particles, optical fields or particles, other items, or a combination of the foregoing.

Moreover, ordinarily skilled artisans will appreciate that any illustrative logical blocks, modules, circuits, and process steps described herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Further, any routines, platforms, or other functionality as disclosed herein associated with or implemented as software may be performed by software modules comprising instructions executable by a process for performing the respective routine, platform, or other functionality.

The foregoing description describes only some examples of implementations of the described techniques. Other implementations are available. For example, the particular naming of the components, capitalization of terms, the attributes, data structures, or any other programming or structural aspect is not mandatory or significant, and the mechanisms that implement the systems and methods described herein or their features may have different names, formats, or protocols. Further, the system may be implemented via a combination of hardware and software, as described, or entirely in hardware elements. Also, the particular division of functionality between the various system components described herein is merely by example, and not mandatory; functions performed by a single system component may instead be performed by multiple components, and functions performed by multiple components may instead be performed by a single component.

It is to be understood that the present disclosure is not to be limited to the disclosed implementations but, on the contrary, is intended to cover various modifications and equivalent arrangements included within the scope of the appended claims.

What is claimed is:

1. A method for gesture control of an interactive event using multiple wearable devices, comprising: receiving, from a first sensor of a first wearable device and a second sensor of a second wearable device, signal data indicative of at least one gesture, wherein the first sensor is at least one of a first accelerometer or a first electromyography (EMG) sensor, the second sensor is at least one of a second accelerometer or a second EMG sensor, and the first sensor is calibrated based on the second sensor; performing, by a computing device in communication with the first wearable device and the second wearable device, pre-processing on the signal data; performing, by the computing device, feature extraction on the pre-processed signal data; and recognizing, by the computing device, the at least one gesture based on similarity between the feature extracted signal data and offline training data.

2. A method for gesture control of an interactive event using multiple wearable devices, comprising:
    receiving, from a first sensor of a first wearable device and a second sensor of a second wearable device, signal data indicative of at least one gesture;
    removing, by a computing device in communication with the first wearable device and the second wearable device, data outliers by applying a first sliding-window-based filter to the signal data;
    performing adaptive filtering on the signal data in response to removing the data outliers;
    removing data indicative of external force by applying a low-pass filter to the adaptive filtered signal data;
    segmenting the signal data by applying a second sliding-window-based filter to the signal data in response to removing the data indicative of external force;
    performing, by the computing device, feature extraction on the segmented signal data; and
    recognizing, by the computing device, the at least one gesture based on the feature extracted signal data and offline training data.

3. The method of claim 2, wherein performing adaptive filtering on the signal data comprises:
   determining a higher quality portion of the signal data; and
   processing the signal data using the higher quality portion to denoise a lower quality portion of the signal data using a least mean squares adaptive filter.

4. The method of claim 3, wherein determining a higher quality portion of the signal data comprises:
   performing a first independent component analysis on portions of the signal data received from the first sensor and a second independent component analysis on portions of the signal data received from the second sensor; and
   selecting the portions of the signal data received from the first sensor or the portions of the signal data received from the second sensor as the higher quality portion of the signal data based on the first independent component analysis and the second independent component analysis.

5. The method of claim 1, wherein performing feature extraction on the pre-processed signal data comprises extracting at least one of a time-domain feature or a frequency-domain feature from the pre-processed signal data.

6. The method of claim 1, wherein determining the at least one gesture comprises:
   combining portions of the feature extracted signal data received from the first sensor and portions of the feature extracted signal data received from the second sensor to generate processed signal data;
   identifying, based on the offline training data, a library of interactive events, wherein gesture probabilities associated with an interactive event indicate a probability that a corresponding gesture is signaled for the interactive event; and
   recognizing the at least one gesture by comparing the processed signal data to gesture probabilities associated with the interactive event.

7. The method of claim 1, wherein the first sensor and the second sensor comprise one or more of a three-axis accelerometer, a six-axis accelerometer, or an electromyography sensor.

8. The method of claim 1, wherein the first sensor is used to calibrate the second sensor and wherein the second sensor is used to calibrate the first sensor.

9. The method of claim 1, wherein the first wearable device and the second wearable device are in direct communication.

10. The method of claim 1, wherein at least one of the first wearable device or the second wearable device is a wristband.

11. A system for gesture control of an interactive event using multiple wearable devices, comprising:
   a first wearable device comprising a first accelerometer, a first electromyography (EMG) sensor, and a first communication component;
   a second wearable device comprising a second accelerometer, a second EMG sensor, and a second communication component, wherein at least one of the second accelerometer or the second EMG sensor is calibrated based on one of the first accelerometer or the first EMG sensor;
   a computing device in communication with the first communication component and the second communication component, the computing device comprising a memory and a processor configured to execute instructions stored in the memory to:
   receive signal data indicative of at least one gesture from the first wearable device and the second wearable device;
   perform pre-processing on the signal data;
   perform feature extraction on the pre-processed signal data; and
   recognize the at least one gesture based on the feature extracted signal data and offline training data.

12. The system of claim 11, wherein the first wearable device and the second wearable device are in direct communication.

13. The system of claim 11, wherein at least one of the first wearable device or the second wearable device is a wristband.

14. The method of claim 8, further comprising:
   calibrating the first sensor and the second sensor to determine a body part to which at least one of the first wearable device or the second wearable device is coupled.

15. The method of claim 1, wherein the offline training data further comprises a bio-mechanical model indicative of probabilities of gestures associated with a body part.

16. The system of claim 11, wherein the signal data comprises first signal data indicative of a motion of the first wearable device and a first muscle activity of a first portion of a user to which the first wearable device is coupled, and second signal data generated by the second sensor indicative of a motion of the second wearable device and a second muscle activity of a second portion of the user to which the second wearable device is coupled.

17. The system of claim 16, wherein the processor is further configured to execute instructions stored in the memory to:
   remove baseline wander data from the second signal data using noise level data of the first signal data.

18. The system of claim 16, wherein the processor is further configured to execute instructions stored in the memory to:
   determine noise variance by comparing the first signal data with the second signal data; and
   generate the signal data by combining the first and the second signal data based on the noise variance.

19. The system of claim 11, wherein the processor configured to determine the at least one gesture based on the feature extracted signal data and offline training data is further configured to execute instructions stored in the memory to:
   adding portions of the feature extracted signal data received from the first wearable device to portions of the feature extracted signal data received from the second wearable device to generate processed signal data;
   identifying, based on the offline training data, a library of interactive events, wherein gesture probabilities associated with an interactive event indicate a probability that a corresponding gesture is signaled for the interactive event, and wherein the probability is predetermined based on at least one of a frequency that the corresponding gesture is made for the interactive event, or a likelihood that the corresponding gesture is made by body parts to which the first and the second wearable device are coupled to; and
   recognizing the at least one gesture by comparing the processed signal data to gesture probabilities associated with the interactive event.

20. The system of claim 11, wherein at least one of the first accelerometer or the first EMG sensor is calibrated based on one of the second accelerometer or the second EMG sensor.

* * * * *